United States Patent
Mohamed et al.

(10) Patent No.: US 11,007,837 B2
(45) Date of Patent: May 18, 2021

(54) METHODS AND APPARATUS FOR OPTIMIZING VEHICLE RIDE PERFORMANCE

(71) Applicant: Ford Global Technologies, LLC, Dearborn, MI (US)

(72) Inventors: Ahmed Mohamed, Dearborn, MI (US); David Michael Russell, Ann Arbor, MI (US); Russ Lee Norton, Brownstown Charter Township, MI (US); Timothy Panagis, Ypsilanti, MI (US); Christopher James Dean, Hyland Park (AU)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 15/884,053

(22) Filed: Jan. 30, 2018

(65) Prior Publication Data

US 2019/0232748 A1 Aug. 1, 2019

(51) Int. Cl.
| | |
|---|---|
| *B60G 17/016* | (2006.01) |
| *B60G 17/0165* | (2006.01) |
| *B60G 17/018* | (2006.01) |
| *B60G 17/019* | (2006.01) |

(52) U.S. Cl.
CPC ....... *B60G 17/0165* (2013.01); *B60G 17/018* (2013.01); *B60G 17/01933* (2013.01); *B60G 2400/102* (2013.01); *B60G 2400/25* (2013.01); *B60G 2400/52* (2013.01); *B60G 2400/82* (2013.01); *B60G 2400/842* (2013.01); *B60G 2401/142* (2013.01); *B60G 2500/10* (2013.01); *B60G 2500/20* (2013.01); *B60G 2800/70* (2013.01)

(58) Field of Classification Search
CPC .......... B60G 17/0165; B60G 17/01933; B60G 17/018; B60G 2400/842; B60G 2400/52; B60G 2400/25; B60G 2401/142; B60G 2500/20; B60G 2500/10; B60G 2400/82; B60G 2400/102; B60G 2800/70
See application file for complete search history.

(56) References Cited

U.S. PATENT DOCUMENTS

| | | | |
|---|---|---|---|
| 7,286,919 B2 | 10/2007 | Nordgren et al. | |
| 9,321,320 B2 | 4/2016 | Norton et al. | |
| 9,417,075 B2 | 8/2016 | Knox et al. | |
| 9,626,763 B1* | 4/2017 | Hoye | ........................ B60R 1/10 |
| 2016/0046166 A1* | 2/2016 | Norton | ................. B60G 17/018 701/37 |
| 2017/0106855 A1 | 4/2017 | Lavoie et al. | |

FOREIGN PATENT DOCUMENTS

| | | |
|---|---|---|
| DE | 102008032545 | 1/2010 |
| FR | 2683776 | 5/1993 |

* cited by examiner

*Primary Examiner* — Michael V Kerrigan
(74) *Attorney, Agent, or Firm* — Ray Coppiellie; Hanley, Flight & Zimmerman, LLC

(57) ABSTRACT

Example methods and systems for optimizing vehicle ride performance are disclosed herein. An example apparatus includes a calculator to calculate a vertical velocity of a vehicle wheel and a comparer to perform a comparison of the vertical velocity to a threshold. The example apparatus includes a damping force manager to determine a damping force to be generated by a vehicle suspension system based on the comparison and a communicator to transmit a request including the damping force to be generated to the vehicle suspension system.

20 Claims, 7 Drawing Sheets

METHODS AND APPARATUS FOR OPTIMIZING VEHICLE RIDE PERFORMANCE

FIELD OF THE DISCLOSURE

This disclosure relates generally to vehicle suspension systems and, more particularly, to methods and apparatus for optimizing vehicle ride performance.

BACKGROUND

As a vehicle (e.g., a car, a truck) travels along a road, the wheels of the vehicle may encounter one or more road bumps that affect movement of the vehicle along the road. For example, as a wheel of the vehicle moves over a road bump, the wheel moves upward relative to the vehicle frame due to the increase in elevation and then rebounds or moves downward as the road substantially levels. Vehicle suspension systems help to maintain contact of the wheel(s) of the vehicle with the road as the wheel(s) travel over the road bump(s). Vehicle suspension systems also improve ride quality for occupant(s) of the vehicle by reducing disruptions to vehicle frame due to the road bump(s), such as prolonged oscillation or bouncing of the frame. An example suspension system associated with a wheel of the vehicle includes a spring and a shock absorber (e.g., a damper). The damping forces of the shock absorber controls oscillation of the wheel and the vehicle frame as the wheel travels over a road bump. The amount of damping forces provided by the shock absorber affects the quality of the ride experienced by the occupant(s) of the vehicle as the suspension system responds to road bumps having differing sizes and/or shapes.

SUMMARY

An example apparatus disclosed herein includes a calculator to calculate a vertical velocity of a vehicle wheel. The example apparatus includes a comparer to perform a comparison of the vertical velocity to a threshold, and a damping force manager to determine a damping force to be generated by a vehicle suspension system based on the comparison. The example apparatus includes a communicator to transmit a request including the damping force to be generated to the vehicle suspension system.

An example method disclosed herein includes calculating a vertical velocity of a vehicle wheel. The example method includes comparing the vertical velocity to a threshold, and determining, by executing an instruction with a processor, a damping force to be generated by a vehicle suspension system based on the comparison. The example method includes transmitting a request including the damping force to be generated to the vehicle suspension system.

Also disclosed herein is a non-transitory computer readable storage medium including example computer readable instructions which, when executed, cause a processor to at least calculate a vertical velocity of vehicle wheel. The example instructions, when executed, cause the processor to compare the vertical velocity to a threshold, and determine a damping force to be generated by a vehicle suspension system based on the comparison. The example instructions, when executed, cause the processor to transmit a request including the damping force to be generated to the vehicle suspension system.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
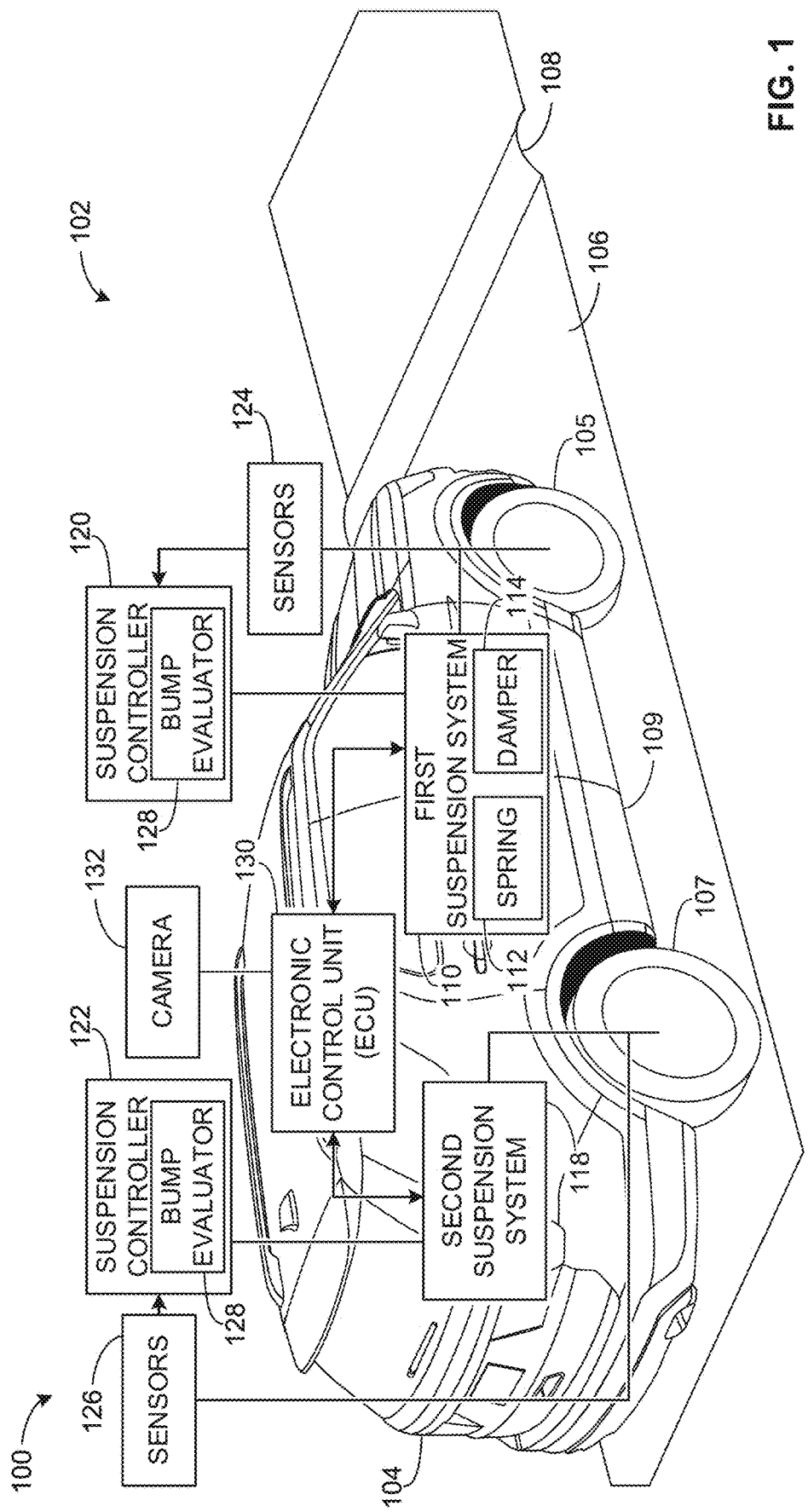
FIG. 1 illustrates an example system constructed in accordance with the teachings disclosed herein and located in an example environment of use.

An example suspension system of a vehicle (e.g., a car, a truck) includes a spring and a damper. The spring allows a wheel of the vehicle to move in response to an uneven road surface while limiting the movement of the remainder of the vehicle in response to the uneven road surface. However, without the damper, the spring would oscillate until its energy dissipated, which may result in prolonged bouncing of the vehicle and, thus, poor ride quality. To prevent prolonged oscillation of the spring, the damper (e.g., a shock absorber) is included in the suspension system to provide a force that resists the oscillations of the spring. In some examples, the damper is a hydraulic damper.

In some vehicle suspension systems, the damping force of the shock absorber can be selectively adjusted based on, for example, a driving mode of the vehicle and/or other driving conditions, such as imperfections in a road along which the vehicle travels. For example, a road may contain one or more bumps (e.g., speed bump(s), speed hump(s), speed table(s), etc.) that disrupt movement of the vehicle along the road when the wheel(s) of the vehicle encounter the road bump(s). Features of the road bump(s), such as size and/or shape of the bump(s), and/or vehicle travel conditions, such as vehicle speed, can affect an amount of damping force required to enable the vehicle to pass over the bump(s) with minimal disruption to the vehicle ride.

Some known vehicles include camera(s) to capture image data corresponding to the road on which the vehicle travels. For example, the camera(s) may generate image data for upcoming portions of the road on which the vehicle is traveling. The image data may indicate change in elevation in the road surface. In some such vehicles, damping forces generated by the suspension system are adjusted based on the image data. However, such known vehicle(s) may not accurately identify road bump(s) and/or may not accurately identify features of the road bump(s) (e.g. height, span) that affect the amount of damping forces that should be applied by the suspension system. Thus, reliance on the image data can result in over- or under-compensation of damping stiffness provided by the suspension system, which can negatively impact quality of the vehicle ride.

Example systems and methods disclosed herein analyze sensor data generated during travel of a vehicle and detect (e.g., predict) that a wheel of the vehicle is traveling over a road bump based on the sensor data. The sensor data can include, for example, vertical wheel velocity data, vehicle body heave acceleration data, suspension displacement data, etc. Some examples disclosed herein adjust damping force(s) generated by a suspension system of the vehicle based on the determination that the wheel is traveling over a road bump. By adjusting the damping force(s) as the wheel is traveling over the road bump, examples disclosed herein improve a response of the suspension system to road bumps and, thus, ride quality. Some disclosed examples instruct the vehicle suspension system to provide a stiffer damping to limit spring oscillations when the wheel encounters a larger road bump as compared to a smaller road bump (e.g., based on vehicle body displacement data). Alternatively, some disclosed examples instruct the vehicle suspension system to reduce a damping stiffness to allow the vehicle wheel, the vehicle frame, etc., to absorb the force of driving over a smaller road bump. Further, some disclosed examples identify false positives with respect to detection of the road bump(s) to prevent unnecessary adjustments to the suspension system and, thus, to the quality of the vehicle ride.

Some disclosed examples apply one or more thresholds to the sensor data to determine if the sensor data is indicative of the wheel(s) of the vehicle traveling over a road bump. For instance, some disclosed examples compare vertical wheel velocity data (which may be calculated based on sensor data generated by sensor(s) coupled to, for example, one of the wheels), to a particular (e.g., predefined) vertical wheel velocity threshold. The vertical wheel velocity threshold can be associated with one or more predefined bump stages, such as an initial bump stage indicating that the wheel may be encountering a road bump, or an intermediate bump stage indicating that the wheel has sustained a change in vertical velocity over a particular time threshold. In some examples, the bump stages correspond to a trajectory over which the wheel travels with respect to the road bump in the direction of travel of the vehicle. For example, when the vehicle is moving a forward direction, a front wheel of the vehicle travels over a front or upward slanting portion of the road bump, which cause the wheel to move upward relative to the vehicle frame (e.g., jounce) The wheel then travels over a rear or downward slanting portion of the road bump, which causes the wheel to drop (e.g. rebound) relative to the frame. Additionally or alternatively, some disclosed examples analyze wheel displacement data, suspension displacement data, and/or body heave acceleration data generated by the sensor(s) to determine whether the wheel has encountered a road bump. Some disclosed examples determine the bump stage(s) and/or identify road bump(s) based on confidence level(s) generated from the comparison of the sensor data to the particular thresholds.

Based on the identified bump stage, some disclosed examples generate one or more instructions in substantially real-time to direct the vehicle suspension system to generate a particular amount of damping force to respond to the road bump and to optimize the ride performance as the wheel travels over the road bump. Some disclosed examples determine that the damping force(s) should be adjusted for one or more bump stages in substantially real-time as the wheel travels over the road bump. Some examples disclosed herein determine that the wheel is not experiencing a road bump and/or driving over the road bump does not require a damping adjustment (e.g., the road bump is small) if the sensor data threshold(s) and/or time threshold(s) are not met. Thus, examples disclosed herein reduce instances of false positives with respect to detection of road bumps and avoid unnecessary changes to the suspension damping forces.

Some examples disclosed herein generate instructions for the damping forces to be adjusted at, for example, the rear wheel(s) of the vehicle based on, for example, the analysis of the sensor data collected from one or more of the front wheels and the determination that the front wheel(s) encountered a road bump. In such examples, the rear wheel suspension system(s) can be adjusted before the rear wheel(s) encounter the road bump to efficiently optimize vehicle ride performance in view of the detected road bump.

In some examples, image data collected by, for example, one or more cameras of the vehicle can supplement the analysis of the sensor data (e.g., the vertical wheel velocity data) for the front and/or rear wheels. Some examples disclosed herein use the image data to detect and/or verify the presence of road bumps in the vehicle's travel path and/or to refine the damping adjustments.

FIG. 1 illustrates an example system 100 constructed in accordance with the teachings disclosed herein and shown in an example environment of use 102. The example of FIG. 1 includes a vehicle 104 travelling on a road 106 in the environment of use 102. The example vehicle 104 can be a car, a van, a truck, etc. The environment of use 102 can include, for example, a highway, a parking lot, a driveway, etc. The road 106 of FIG. 1 includes a road bump 108. In the example of FIG. 1, as the vehicle 104 travels along the road 106, the vehicle 104 passes over the road bump 108. The example road 106 can include additional road bumps 108 than illustrated in FIG. 1. Also, the road bump 108 can have different shapes and/or sizes than illustrated in FIG. 1. For instance, in some examples, the road bump 108 has a width greater than the width of the vehicle 104; in other examples, the road bump 108 has a width substantially less than the width of the vehicle 104 (e.g., less than half the width of the vehicle 104).

The right side of the example vehicle 104 shown in FIG. 1 includes a first (e.g., front) wheel 105 and a second (e.g., rear) wheel 107 coupled to a body 109 of the vehicle 104. The left side of the example vehicle 104 mirrors the right side of the vehicle 104 of FIG. 1 (e.g., the left side includes the corresponding front and rear wheels 105, 107) and, for brevity, will not be discussed herein. The vehicle 104 can have additional or fewer wheels than illustrated in FIG. 1. In the example of FIG. 1, one or more of the wheels 105, 107 travels over the road bump 108 as the vehicle 104 travels along the road 106. The number of wheels of the vehicle 104 that encounter the road bump 108 can be based on, for example, the width of the road bump 108, the position of the vehicle 104 on the road 106 relative to the road bump 108, etc.

The example vehicle 104 of FIG. 1 includes a first or front suspension system 110 having a spring 112 and a damper 114. In the example of FIG. 1, the first suspension system 110 helps to maintain contact of the first wheel 105 of the vehicle 104 with the road 106 as the vehicle 104 travels along the road 106 and, in particular, as the first wheel 105 travels over the road bump 108. Additionally, the example vehicle 104 of FIG. 1 includes a second or rear suspension system 118 to help maintain contact of the rear wheel 107 with the road 106. The second suspension system 118 can be substantially the same as the first suspension system 110, including, for example, the spring 112 and the damper 114.

The example first and second suspension systems 110, 118 of the vehicle 104 are communicatively coupled to one or more controllers of the vehicle 104. For example, the first suspension system 110 of FIG. 1 is communicatively coupled to a first suspension controller 120. As the first wheel 105 of the example vehicle 104 travels over the road bump 108, the suspension controller 120 determines the damping force to be provided by the example damper 114 of the first suspension system 110. The example first suspension controller 120 generates one or more instructions including, for instance, the amount of damping force to be generated by the damper 114 and transmits the instruction(s) to the first suspension system 110.

The example second suspension system 118 of FIG. 1 can be communicatively coupled to the first suspension controller 120 and/or another suspension controller. In the example of FIG. 1, the second suspension system 118 is communicatively coupled to a second suspension controller 122, which may be a dedicated suspension controller for the rear suspension system 118. In some examples, the suspension controller(s) 120, 122 are implemented by an electronic control unit (ECU) 130 of the vehicle 104.

The example suspension systems 110, 118 of the vehicle 104 of FIG. 1 include sensors to generate sensor data indicative of behavior of the vehicle 104 as the vehicle 104 travels along the road 106. The sensor data is transmitted to the respective suspension controller(s) 120, 122 for, for example, storage, filtering, and/or analysis with respect to operation of the suspension system(s) 110, 118. For example, the first suspension system 110 includes one or more sensor(s) 124, such as vehicle velocity sensor(s), accelerometer(s), and/or position sensor(s) to measure vertical wheel displacement relative to the body 109 of the vehicle 104. The sensor(s) 124 of the first suspension system 110 can be coupled to a frame of the vehicle body 109, the first wheel 105, a wheel axle, etc. In the example of FIG. 1, the sensor(s) 124 transmit the sensor data to the example first suspension controller 120 for analysis with respect to the damping forces to be generated by the first suspension system 110. In some examples, the sensor(s) 124 transmit the sensor data to the first suspension controller 120 in substantially real-time as the data is collected. Additionally, the second suspension system 118 includes one or more sensor(s) 126. The sensor(s) 126 of the second suspension system 118 can include the same sensor(s) as the sensor(s) 124 of the first suspension system 110 (e.g., accelerometer(s), position sensor(s), etc.). In some examples, the second suspension system 118 includes different sensor(s) than the first suspension system 110.

The example suspension controllers 120, 122 of FIG. 1 include means for detecting that the vehicle 104 is passing over the road bump 108 and, based on the detection, determining damping force(s) to be provided by the suspension system(s) 110, 118 to adjust the vehicle ride in response to the road bump 108. In the example of FIG. 1, each of the first and second suspension controllers 120, 122 include a bump evaluator 128 to detect the road bump 108 and to determine the damping forces.

The example bump evaluator 128 of, for example, the first suspension controller 120 of FIG. 1 determines whether the first wheel 105 of the vehicle is passing over the road bump 108 based on the data collected by the sensor(s) 124. Based on the determination that the first wheel 105 is passing over the road bump 108, the bump evaluator 128 determines the damping force to be provided by the first suspension system 110 (e.g., by the damper 114) to minimize disruptions to vehicle ride quality in response to the road bump 108. In some examples, the bump evaluator 128 identifies two or more bump stages corresponding to a travel path of the wheel 105 over the road bump 108. For example, the bump evaluator 128 can identify an initial bump stage based on sensor data indicating wheel jounce, or movement of the wheel 105 upward relative to the vehicle body 109 (e.g., a frame of the body). Based on sensor data indicative of wheel rebound, or movement of the wheel 105 away from the vehicle body 109, the bump evaluator 128 can determine that the wheel is entering a final bump stage. In anticipation of the wheel 105 continuing to fall relative to the vehicle body 109 as the road bump 108 ends and the road 106 substantially levels (e.g., without potholes, road bumps, elevation changes, etc.), the bump evaluator 128 may instruct the first suspension system 110 to generate increased damping force to damp the oscillations of the spring 112.

Similarly, the bump evaluator 128 of the second controller 122 receives data from the sensors 126 of the second suspension system 118 (e.g., wheel velocity sensor(s), accelerometer(s), sensor(s) to measure vertical wheel displacement, etc.), detects that the second wheel 107 is traveling over the road bump 108 based on the sensor data, and determines the damping forces to be provided by the second suspension system 118. In some examples, the bump evaluator 128 of the first suspension controller 120 communicates with the bump evaluator 128 of the second suspension controller 122 (e.g., via the ECU 130, in substantially real-time) with respect to, for example, the detection of the road bump 108 based the sensor data collected for the first wheel 105, the corresponding damping force(s) calculated in response to the detection of the road bump at the first wheel 105, etc. In some such examples, damping force data received from the example bump evaluator 128 of the first suspension controller 120 is used by the bump evaluator 128 of the second suspension controller 122 to adjust the damping force(s) provided by the second suspension system 118. For example, the bump evaluator 128 of the second suspension controller 122 can estimate a time for the second wheel 107 to contact the road bump 108 (e.g., based on vehicle velocity data) and adjust the damping force to be generated by the second suspension system 118 based on the information from the bump evaluator 128 of the first suspension controller 120. In some such examples, the bump evaluator 128 of the second suspension controller 122 adjusts the damping force provided by the first suspension controller 120 based on the sensor data received from the sensors of the second suspension system 118 (e.g., as the second wheel 107 travels over the road bump 108). In other examples, the bump evaluator 128 of the second suspension controller 122 determines the damping forces to be generated by the second suspension system 118 based on the sensor data collected by the sensor(s) 126 of the second suspension system 118. In such examples, the bump evaluator 128 of the second suspension controller 122 may use the data from the sensors of the second suspension 118 to adjust the damping forces calculated by the bump evaluator 128 of the first suspension controller 120 or to calculate the damping forces independently to account for changes in vehicle behavior (e.g., velocity, course of travel) as the second wheel 107 travels over the road bump 108.

In some examples, the vehicle 104 includes one or more cameras 132. The camera(s) 132 can capture image data of, for instance, the road 106 as the vehicle 104 travels along the road 106. The image data can represent, for instance, a profile of portion(s) of the road 106 over which the vehicle 104 is currently travelling and/or portion(s) of the road 106 in a travel path of the vehicle 104. In some examples, the bump evaluator 128 of the first and/or second suspension controller 120, 122 uses the image data generated by the camera(s) 132 to confirm that the vehicle 104 is traveling over a road bump and/or to adjust the damping force(s) based on the image data.

Figure 2:
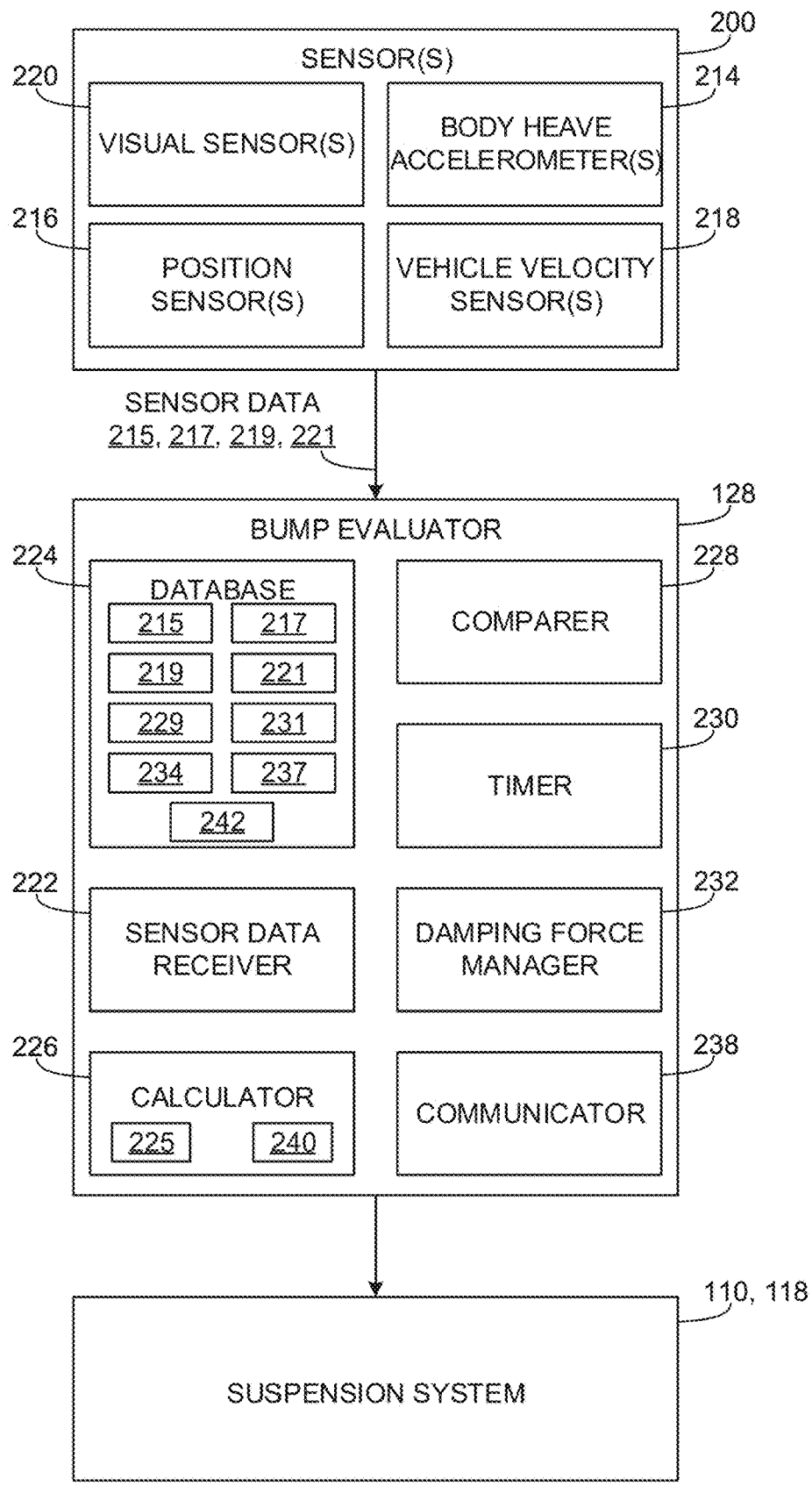
FIG. 2 is a block diagram of an example implementation of the example system of FIG. 1.

FIG. 2 is a block diagram of an example implementation of the example system 100 of FIG. 1. As mentioned above, the bump evaluator 128 is constructed to detect when one or more wheels of a vehicle (e.g., the wheels 105, 107 of the example vehicle 104 of FIG. 1) is traveling over a road bump based on sensor data collected by one or more sensors of a vehicle. As also mentioned above, the bump evaluator 128 is constructed to determine damping forces to be provided by the suspension system(s) of the vehicle (e.g., the first and second suspension systems 110, 118 of FIG. 1) in response to the road bump 108 and to transmit the requested damping forces to the suspension system(s). In the illustrated example of FIG. 2, the bump evaluator 128 may be implemented by one or more controllers of the example vehicle 104 of FIG. 1, such as the first suspension controller 120 and/or the second suspension controller 122.

As mentioned above, the example bump evaluator 128 receives sensor data from one or more sensor(s) 200 (e.g., the sensor(s) 124, 126 of the suspension system(s) 110, 118 of FIG. 1, sensor(s) of the camera(s) 132) coupled to one or more portions of the vehicle 104. The sensor(s) 200 of FIG. 2 can be coupled to a frame of the vehicle 104, the wheel(s) 105, 107 of the vehicle 104, etc. In FIG. 2, the example sensors 200 include one or more body heave accelerometers 214, one or more position sensors 216, and one or more vehicle velocity sensors 218. In some examples, the sensor(s) 200 include visual or image data sensor(s) 220 in examples where, for instance, the vehicle 104 includes the camera(s) 132.

In the example of FIG. 2, the body heave accelerometer(s) 214 measure acceleration of the body 109 of the vehicle 104 during, for example, heave or bounce (e.g., up and down movement) of the body 109 relative to the road 106 during travel of the vehicle 104. The example accelerometer(s) 214 generate body heave acceleration data 215.

The example position sensor(s) 216 detect changes in position (e.g., vertical position) of the wheel(s) 105, 107 relative to the body 109 of the vehicle 104. In such examples, the position sensor(s) 216 are coupled to one or more portions of the wheel(s) 105, 107. The position sensor(s) 216 detect displacement of the respective wheel(s) 105, 107 as the wheel(s) 105, 107 move upward relative to the body 109 of the vehicle 104 (e.g., jounce) or downward relative to the body 109 (e.g., rebound) in response to, for examples, changes in road conditions (e.g., road bumps, potholes, etc.).

Additionally or alternatively, the example system 100 can include the position sensor(s) 216 to detect displacement (e.g., vertical displacement) of the suspension system(s) 110, 118 relative to, for example, the body 109 of the vehicle 104 as the vehicle 104 travels along the road 106. In such examples, the position sensor(s) 216 can detect displacement of the damper(s) 114 of the suspension system(s) 110, 118 as the damper(s) 114 provide adjustable forces in response to road conditions. The example position sensor(s) 216 generate position data 217 based on the displacement of the wheel(s) 105, 107 and/or the suspension system(s) 110, 118.

The example vehicle velocity sensor(s) 218 of FIG. 2 detect the velocity of the vehicle 104 as the vehicle 104 travels on the road 106 of FIG. 1. The vehicle velocity sensor(s) 218 generate vehicle velocity data 219 indicative of the vehicle velocity.

The example visual sensor(s) 220 of FIG. 2 collect visual data (e.g., image data) of, for example, one or more portions of the road 106 of FIG. 1 as the vehicle 104 travels on the road 106. The example visual sensor(s) 220 can include a still camera and/or a video camera (e.g., the camera(s) 132 of FIG. 1) to generate pixel image data. In some examples, the visual sensor(s) 220 include a laser rangefinder. The visual sensor(s) 220 generate visual data 221 indicative of a profile of the road 106 and/or changes in the road profile.

The example system 100 can include additional or fewer sensors than illustrated in FIG. 2. For example, accelerometers can be used to obtain data from the wheel(s) 105, 107 with respect to rate of change of the wheel velocity. Additionally or alternatively, the example system 100 can include other types of sensors than illustrated in FIG. 2. For example, the system 100 can include angular wheel velocity sensor(s), tire pressure sensor(s), temperature sensor(s), gyro sensor(s), etc. to collect data about the wheel(s) 105, 107 and/or the suspension system(s) 110, 118 during operation of the vehicle 104.

In the example of FIG. 2, the sensor(s) 214, 216, 218, 220 transmit the respective sensor data 215, 217, 219, 221 generated by the sensor(s) to the bump evaluator 128. The sensor(s) 214, 216, 218, 220 can transmit the sensor data 215, 217, 219, 221 to the bump evaluator 128 via one or more wired or wireless communication connections. The example bump evaluator 128 includes a sensor data receiver 222 to receive the sensor data 215, 217, 219, 221. As shown in FIG. 2, the sensor data 215, 217, 219, 221 received by the sensor data receiver 222 is stored in a database 224 of the example bump evaluator 128. In some examples, the sensor data receiver 222 processes the sensor data 215, 217, 219, 221 before storing the processed sensor data 215, 217, 219, 221 in the database 224 by, for example, filtering the data to remove noise, converting the sensor data from analog data to digital data, etc. Also, in some examples, the database 224 is disposed at a location separate from the example bump evaluator 128, such as in a memory of the ECU 130 of the vehicle 104.

The example bump evaluator 128 of FIG. 2 includes a calculator 226. The example calculator 226 calculates vertical wheel velocity data 225 for the wheel(s) 105, 107 based on, for example, the position data 217 indicative of position(s) of the wheel(s) 105, 107 over time. In some other examples, the calculator 226 uses the position data 217 indicative of the displacement of damper(s) 114 of the suspension system(s) 110, 118 to calculate the vertical wheel velocity data 225 (e.g., based on stroke velocity of the damper(s) 114 determined from the damper position data 217). In some examples, the calculator 226 calculates the vertical wheel velocity data 225 in substantially real-time as the sensor data is received from the sensor(s) 214, 216, 218 (e.g., during travel of the vehicle 104). The vertical wheel velocity data 225 may be stored in the example database 224.

The example bump evaluator 128 of FIG. 2 includes a comparer 228. The example comparer 228 of FIG. 2 compares the vertical wheel velocity data 225 to one or more particular (e.g., predefined) thresholds to detect when the vehicle 104 is traveling over a road bump (e.g., the road bump 108 of FIG. 1) and to determine the damping forces to be provided by the suspension system(s) 110, 118 in response to the road bump. In some examples, the comparer 228 uses the sensor data, such as the position data 217, the body heave acceleration data 215, and/or the vehicle velocity data 219 to detect that the vehicle 104 is traveling over the road bump and/or to determine the damping forces to be generated.

The example comparer 228 of FIG. 2 can detect that, for instance, the first wheel 105 is starting to jounce (e.g., move upward relative to the vehicle body 109) based on a comparison of the vertical wheel velocity data 225 generated by the calculator 226 to a (e.g. first) vertical wheel velocity threshold 229. The vertical wheel velocity threshold(s) 229 discussed herein can be based on, for example, known changes in vertical wheel velocity when a wheel of a vehicle engages with a road bump or a change in road elevation. In the example of FIG. 2, the vertical wheel velocity threshold(s) 229 can correspond to vehicle behavior (e.g., changes in wheel velocity, suspension displacement) as the vehicle travels over one or more portions of a road bump. As disclosed herein, the portions of the road bump correspond to bump stages that are used by the example bump evaluator 128 to detect the road bump and adjust the damping force(s). The vertical wheel velocity threshold(s) 229 can be provided via user input(s) received by the bump evaluator 128 and stored in the example database 224 of FIG. 2. In the example of FIG. 2, if the comparer 228 determines that the vertical wheel velocity data 225 satisfies the first vertical wheel velocity threshold 229, the comparer 228 determines that the first wheel 105 is in a first bump stage.

In some other examples, the comparer 228 determines that the first wheel 105 is starting to jounce based on performing a comparison of wheel position data 217 to a particular (e.g., predefined) vertical wheel position threshold. In other examples, the comparer 228 detects jounce of the wheel 105 based on displacement of the damper 114 of the first suspension system 110 relative to a position threshold. For example, the vertical wheel velocity threshold can be satisfied based on the position data 217 for the wheel 105 (or, in some examples, the first suspension system 110) exceeding a particular vertical position threshold. The vertical position threshold can be based on data for known road bump(s), such as an average change in wheel position when a wheel moves over a road bump, an average height of road bump(s), etc.

The example bump evaluator 128 of FIG. 2 includes a timer 230. In the example of FIG. 2, when the comparer 228 detects that the wheel(s) 105, 107 are experiencing jounce, the comparer 228 activates the timer 230. The timer 230 serves as a counter for monitoring changes in the vertical wheel velocity data 225 over one or more time periods (e.g., 1-2 milliseconds). In the example of FIG. 2, the comparer 228 monitors the vertical wheel velocity data 225 received from the calculator 226 during travel of the vehicle 104 relative to a particular (e.g., predefined) time threshold 231. The time threshold(s) 231 can be defined by one or more user inputs and can be stored in the example database 224.

Continuing to refer to the first wheel 105 for example purposes, if the comparer 228 determines that the vertical wheel velocity data 225 for the first wheel 105 does not indicate a change in vertical wheel velocity within the time period defined by the (e.g., first) time threshold 231, then the comparer 228 determines that first wheel 105 is not traveling over a road bump. In such examples, the first wheel 105 may have encountered, for example, a relatively small bump in a substantially flat road. In such examples, the comparer 228 continues to monitor the vertical wheel velocity data 225 to determine if the vehicle 104 encounters road bump(s) at a later time.

If the comparer 228 determines that the vertical wheel velocity data 225 for the first wheel 105 has changed within the (e.g., first) predefined time threshold 231, the comparer 228 determines if the vertical wheel velocity data 225 satisfies a (e.g., second) vertical wheel velocity threshold 229. If the comparer 228 determines that the vertical wheel velocity data 225 satisfies the (e.g., second) vertical wheel velocity threshold 229, the comparer 228 determines that vehicle 104 is traveling over a road bump.

The example bump evaluator 128 of FIG. 2 includes a damping force manager 232. In the example of FIG. 2, when the comparer 228 determines that the vehicle 104 is traveling over a road bump, the comparer 228 communicates with the example damping force manager 232 to determine an amount of damping force to be provided by the suspension system(s) 110, 118 of the vehicle 104. The example damping force manager 232 determines the damping force(s) to be requested from the suspension system(s) 110, 118 based on, for example, the vertical wheel velocity data 225, the vehicle velocity data 219, and/or the body heave acceleration data 215. In some examples, the damping force manager 232 applies one or more damping force rules 234 to determine the damping force to be requested. The damping force rule(s) 234 can be defined based on known damping forces in response to road bump shape and/or size, spring type, vehicle type, vehicle mass, vehicle suspension type, the vehicle velocity data 219, etc. For example, the damping force level(s) and/or time durations for implementing the force level(s) can vary based on vehicle type and/or suspension type. In such examples, the damping force rule(s) 234 vary from one vehicle or suspension type to another. The example damping force rule(s) 234 can be defined by user input(s) and can be stored in the example database 224 of FIG. 2. In some examples, the damping force rule(s) 234 define a length of time, or a damping hold period, for which the requested damping force should be applied when, for example, the road bump ends to dampen the oscillations of the vehicle body 109 (e.g., based on vehicle type, mass, etc.).

The example bump evaluator 128 of FIG. 2 includes a communicator 238. In the example of FIG. 2, the communicator 238 provides means for communicating the damping force(s) requested by the damping force manager 232 to the suspension system(s) 110, 118 (e.g., via the suspension controller(s) 120, 122). In the example of FIG. 2, the communicator 238 communicates the requested damping force(s) to the suspension system(s) 110, 118 in substantially real-time (e.g., 1-2 milliseconds) as the damping force(s) are determined by the damping force manager 232 to enable the suspension system(s) 110, 118 to respond to the road bump. In some examples, the suspension system(s) 110, 118 responds to the damping force adjustments within, for instance, 15-30 milliseconds of receiving the instructions from the communicator 238.

In the example of FIG. 2, the comparer 228 continues to monitor the vertical wheel velocity data 225 of, for example, the first wheel 105, relative to particular vertical wheel velocity threshold(s) 229 and time threshold(s) 231 to verify that the first wheel 105 is traveling over the road bump and to enable the damping force manager 232 to determine the damping force(s) to be provided as the first wheel 105 travels over the road bump. As discussed herein, the vertical wheel velocity threshold(s) 229 and/or the time threshold(s) 231 can be based on known bump stages corresponding to a travel trajectory of the wheel(s) 105, 107 over the road bump. The bump stage(s) and corresponding threshold(s) can be based on known shape(s) of road bump(s) that cause the wheel to experience jounce and rebound as the wheel travels over the road bump(s). For example, a vertical wheel velocity threshold 229 can be defined to detect rebound of the wheel corresponding to a portion of the road bump with decreasing elevation. The vertical wheel velocity threshold 229 indicative of wheel rebound can be applied by the comparer 228 after a predefined time period has passed, or a time at which the road is expected to begin to level.

In the example of FIG. 2, if the comparer 228 determines that the vertical wheel velocity data 225 does not satisfy one of the vertical wheel velocity threshold(s) 229 and/or does not satisfy the vertical wheel velocity threshold 229 within a particular time threshold 231, the comparer 228 determines that the wheel(s) 105, 107 are not traveling over a road bump. In such examples, the comparer 228 transmits message(s) to the damping force manager 232 indicating the wheel(s) 105, 107 are not traveling over a road bump. As a result, the damping force manager 232 instructs the suspension system(s) 110, 118 to reduce damping force(s). The iterative comparisons of the vertical wheel velocity data 225 against different thresholds corresponding to the road bump travel trajectory by the example comparer 228 reduce instances of false positives with respect to the prediction that the vehicle 104 is traveling over a road bump. The reduction in false positives substantially prevents unnecessary adjustments to the damping force(s) (e.g., increased damping force(s)) that may degrade ride quality.

Based on the feedback from the comparer 228, the damping force manager 232 determines the damping force to be requested for the different stage(s) of travel of the wheel(s) 105, 107 over the road bump. For example, upon determination that the wheel(s) 105, 107 have encountered a road bump, the damping force manager 232 may request an increased damping force as compared to the damping force requested when the road is substantially level. As the wheel(s) 105, 107 continue to travel over the road bump, the damping force manager 232 may request an intermediate or gradually increase damping force so as not to hold motion of the body 109 of the vehicle overly rigid or tight as the wheel(s) 105, 107 prepare to fall as the road bump ends. After a particular (e.g., predefined) time period and based on the detection by the comparer 228 that the vertical wheel velocity data 225 indicates rebound of the wheel(s) 105, 107, the damping force manager 232 increases the damping force (e.g., to a maximum damping force) to substantially reduce oscillations of the vehicle body 109 as the road levels. In the example of FIG. 2, the example damping force manager 232 continues to request damping force(s) from the suspension system(s) 110, 118 for a predefined period of time (e.g., based on the damping force rule(s) 234) after the comparer 228 determines that the wheel is rebounding based on the vertical wheel velocity data 225.

In some examples, the example damping force manager 232 selectively reduces the amount of damping force requested after initially requesting an increase in the amount of damping force. The exampling damping force manager 232 may request the reduction in damping force to verify that the wheel(s) 105, 107 are traveling over the road bump based on, for example, the vertical wheel velocity data 225 generated after the reduction in damping force. If the comparer 228 determines that the vertical wheel velocity data 225 generated after the reduction in damping force satisfies a corresponding vertical wheel velocity threshold 229 indicative of wheel jounce, the comparer 228 confirms that the wheel(s) 105, 107 are traveling over the road bump. Based on the confirmation of the detection of the road bump, the damping force manager 236 increases (e.g., re-increases) the damping force requested for a remainder of time for which the wheel travels over the road bump. As mentioned above, if the comparer 228 determines the vertical wheel velocity data 225 does not meet one of the threshold(s) 229, 231, and, thus, determines that the wheel(s) 105, 107 are not traveling over a road bump, the damping force manager 232 instructs the suspension system(s) 110, 118 to reduce or continue to reduce the damping force(s) generated. Thus, the example damping force manager 232 dynamically responds to changes in vertical wheel velocity and the iterative checks performed by the comparer 228 to verify that the vehicle 104 is moving over the road bump.

In some examples, the comparer 228 compares the body heave acceleration data 215 to a body heave acceleration threshold 237 to determine if the road bump has affected movement of the vehicle body 109. The body heave acceleration threshold 237 can be based on, for example, a predefined or allowable amount of vehicle body motion for a particular vehicle type, mass, particular standards for ride quality, etc. In such examples, the damping force manager 232 may determine the damping force to be provided based on the body heave acceleration data 215 to, for example, reduce oscillations of the vehicle body 109 when the wheel(s) 105, 107 impact the road after the road bump ends and the road substantially levels. Thus, in some examples, the comparer 228 of FIG. 2 verifies that the vehicle body is or is likely to be affected by the road bump before instructing the damping force manager 232 to adjust the damping force(s). In considering the body heave acceleration data 215, the example bump evaluator 128 of FIG. 2 reduces instances of undue adjustments to damping force(s) and, thus, provides for improved ride quality in response to vehicle behavior and road conditions.

As mentioned above, in some examples, the vehicle 104 includes the visual sensor(s) 220 such as camera(s). In some such examples, the sensor data receiver 222 receives the visual data 221 generated by the visual sensor(s) 220. The comparer 228 of the bump evaluator 128 can use the visual data 221 to detect changes in road height relative to the body 109 of the vehicle 104. Based on the visual data 221, the comparer 228 can confirm the detection of the road bump based on the other sensor data such as the body heave acceleration data 215 and the position data 217. In some examples, the comparer 228 uses the visual data 220 in addition to the other sensor data to detect the road bump(s). In some examples, the calculator 226 calculates or estimates changes in road height along one or more portions of the road 106 based on the visual data 220 to generate road height data 240. The comparer 228 can use the road height data 240 to predict whether the change(s) in road height, which may be indicative of road bump(s), will affect the ride quality based on, for example a road height threshold 242. Thus, in some examples, the example bump evaluator 128 uses visual data to supplement and/or verify the detection of the road bump(s) based on sensor data indicative of vehicle behavior.

In some examples, the bump evaluator 128 of FIG. 2 is associated with one of the suspension systems of the vehicle 104, such as the first suspension system 110 or the second suspension system 118 of FIG. 1. In such examples, the communicator 238 of the bump evaluator 128 may transmit data such as the vertical wheel velocity data 225, the road height data 240, and/or the damping force instructions to a bump evaluator 128 of one or more other suspension system controllers of the vehicle (e.g., controller(s) of the right rear wheel suspension system, the left wheel rear suspension system, the left front wheel suspension system, etc.). Thus, the communicator 238 can share data about road conditions, changes to the vehicle behavior, and/or damping force adjustments with other suspension controllers of the vehicle 104.

For example, the communicator 238 of the bump evaluator 128 of the first suspension controller 120 of FIG. 1 can inform the bump evaluator 128 of the second suspension controller 122 that the first wheel 105 encountered the road bump 108. In such examples, the calculator 226 of the bump evaluator 128 of the example second controller 122 can use the vehicle velocity sensor data 219 to calculate the velocity of the vehicle 104. The calculator 226 can calculate a time at which the rear wheel 107 will contact the road bump 108. In some such examples, the damping force manager 232 of the bump evaluator 128 of the second controller 122 instructs the second suspension system 118 to generate damping forces based on the time that the second wheel 107 is expected to contact the road bump 108. In some other examples, the bump evaluator 128 of the second controller 122 analyzes sensor data from the sensor(s) 126 of the second suspension system 118 (e.g., position data for the rear wheel 107) before instructing the second suspension system 118 to adjust the damping forces at the rear wheel 107. In some such examples, the bump evaluator 128 of the second controller 122 uses the data generated by the sensor(s) 126 proximate to the rear of the vehicle 104 to confirm that the rear wheel 107 is also traveling over the road bump and to determine the damping forces to be generated by the second suspension system 118 based on vehicle activity at the rear wheel 107.

Figure 3:
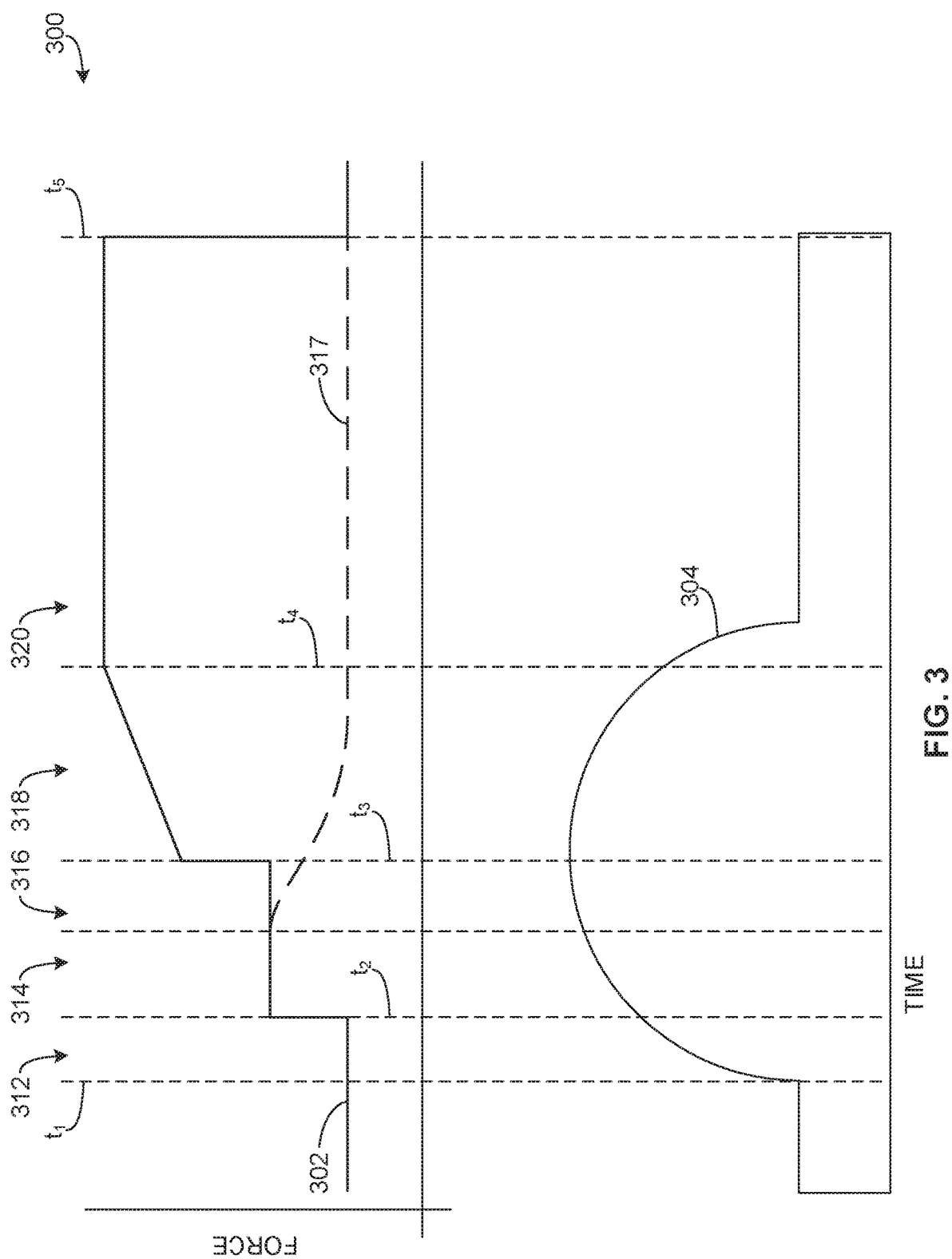
FIG. 3 is a graph illustrating example damping forces to be provided by an example suspension system of a vehicle as the vehicle travels over a road bump, the damping forces determined by the example bump evaluator of FIGS. 1 and 2.

FIG. 3 is a graph 300 illustrating example requested damping force 302 requested by the damping force manager 232 of the example bump evaluator 128 of FIGS. 1 and 2 as a vehicle (e.g., the vehicle 104 of FIG. 1) travels over a road bump 304 (e.g., the road bump 108 of FIG. 1). Although the example road bump 304 is shown as having a substantially semicircular cross section, in other examples, the road bump 304 can have different shapes and/or sizes, such as a substantially curved shaped having multiple radii or a substantially irregular or asymmetrically shape including vertices.

In the illustrated example of FIG. 3, a wheel (e.g., the wheel(s) 105, 107) initially contacts the road bump 304 at time $t_1$. As the wheel engages the road bump 304, the wheel begins to jounce, or move toward a body of the vehicle (e.g., the body 109 of FIG. 1). In the example of FIG. 3, the damping force manager 232 refrains from requesting an increase in damping force from suspension system(s) of the vehicle (e.g., the suspension system(s) 110, 118 of FIGS. 1 and 2). Instead, the example comparer 228 determines if the vertical wheel velocity (e.g., the vertical wheel velocity data 225 of FIG. 2) of the wheel satisfies a first vertical wheel velocity threshold (e.g., one of the vertical wheel velocity thresholds 229) within a first time period defined by time $t_1$ and $t_2$ (e.g., one of the time thresholds 231 of FIG. 2). If the comparer 228 determines that the vertical wheel velocity satisfies the thresholds, the comparer 228 determines that the wheel is in a first bump stage 312.

In the example of FIG. 3, comparer 228 continues to monitor the vertical wheel velocity to determine if the vertical wheel velocity satisfies a second vertical wheel velocity threshold indicative of jounce of the wheel within a second time period defined by times $t_2$ and $t_3$. If the comparer 228 determines that the second vertical wheel velocity threshold is satisfied, the comparer 228 determines the wheel is in a second bump stage 314. In such examples, the damping force manager 232 requests an increase in damping force 302 from the suspension system(s). Thus, the bump evaluator 128 uses the first and second bump stages 312, 314 to verify that the wheel is traveling over the road bump 304 rather than requesting an increase in damping force at the first bump stage 312.

The example comparer 228 of FIG. 2 continues to monitor the vertical wheel velocity of the wheel. The example comparer 228 determines if the vertical wheel velocity satisfies a third vertical wheel velocity threshold indicative of wheel jounce. If the vertical wheel velocity satisfies the third vertical wheel velocity threshold, the bump evaluator 128 confirms that the wheel is traveling over the road bump 304. In such examples, the comparer 228 determines that the wheel is in a fourth bump stage 318, as discussed below.

In some examples, the comparer 228 determines that vertical wheel velocity does not satisfy the third vertical wheel velocity threshold indicative of jounce of the wheel. In such examples, the comparer 228 determines that the wheel is in a third bump stage 316 (which, in some examples, at least partially overlaps with a time period of the second bump stage 314). For example, the road bump 304 may be a relatively small bump that does not require further adjustment of the requested damping force 302 (i.e., after the adjustment at second bump stage 314). In such examples, the damping force manager 232 reduces (e.g., gradually decreases) the requested damping force 302, as represented by the dashed line 317 of FIG. 3. The example comparer 228 continues to monitor the vertical wheel velocity to determine if the vertical wheel velocity satisfies a fourth vertical wheel velocity threshold within a predefined time period.

In such examples, if comparer 228 determines that the vertical wheel velocity meets the fourth vertical wheel velocity threshold, the damping force manager 232 requests an increase in the damping force after previously requesting a decrease in the damping force (e.g., as represented by the dashed line 317 of FIG. 3). Thus, in examples where the vertical wheel velocity does not meet the third vertical wheel velocity threshold, the bump evaluator 128 determines that the damping forces should be decreased, but then rechecks the wheel behavior to confirm whether or not the wheel is traveling over the road bump (e.g., based on the fourth vertical wheel velocity threshold). If the comparer 228 determines that the vertical wheel velocity meets the fourth vertical wheel velocity threshold, the comparer 228 confirms that the wheel is traveling over the road bump and the damping force manager 232 increases the damping force. In such examples, the comparer 228 determines that the wheel is in the fourth bump stage 318.

If the comparer 228 determines that the vertical wheel velocity does not meet the third vertical wheel velocity threshold and does not meet the fourth vertical wheel velocity threshold, the comparer 228 determines that the wheel is not traveling over the road bump or only traveled over a small road bump that does not substantially impact wheel position and/or vertical wheel velocity and, thus, is not likely to affect or substantially affect vehicle body motion. In such examples, the damping force manager 232 decreases or continues to decrease the damping forces so as not to interfere with vehicle ride quality. Thus, the bump stage two and/or bump stage three can be used to increase confidence level(s) at which the example bump evaluator 128 determines that the wheel is traveling over the road bump.

As discussed above, the example comparer 208 can determine that the wheel is in the fourth bump stage 318 based on (1) the wheel vertical velocity meeting the third vertical wheel velocity or (2) the wheel vertical velocity not meeting the third vertical wheel velocity threshold but meeting the fourth vertical velocity threshold (e.g., at the third bump stage 316). If the comparer 208 determines that the wheel is in the fourth bump stage 318, the damping force manager 232 requests an intermediate or gradual increase in the damping force 302. The damping force manager 232 requests the intermediate or gradual increase in damping force to reduce movement of the vehicle body but not to cause the suspension system(s) to hold the vehicle body overly rigid or tight in anticipating of rebound of the wheel as the road bump begins to end.

The example comparer 228 of FIG. 2 compares body heave acceleration data (e.g., the data 215) to a body heave acceleration threshold (e.g., the body heave acceleration threshold 237 of FIG. 2) to determine if the motion of the vehicle body has been affected by the road bump 304. If the body heave acceleration data satisfies the body heave acceleration threshold 237 and if the vertical wheel velocity satisfies a fifth vertical wheel velocity threshold indicating that the wheel is rebounding, the comparer 228 determines that the wheel is in a fifth bump stage 320. In the example fifth bump stage 320, the damping force manager 232 increases the requested damping force 302 (e.g., to a maximum amount requested). The fifth bump stage 320 is maintained by the bump evaluator 128 for a predefined period of time, or a damping hold time period (e.g., until time t6). After the damping hold time period ends, the damping force manager 232 decreases the requested damping force 302 as the road substantially levels.

While an example manner of implementing the bump evaluator 128 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor data receiver 222, the example database 224, the example calculator 226, the example comparer 228, the example timer 230, the example damping force manager 232, the example communicator 238 and/or, more generally, the example bump evaluator 128 of FIGS. 1 and/or 2 may be implemented by hardware, software, firmware and/or any combination of hardware, software and/or firmware. Thus, for example, any of the example sensor data receiver 222, the example database 224, the example calculator 226, the example comparer 228, the example timer 230, the example damping force manager 232, the example communicator 238 and/or, more generally, the example bump evaluator 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor data receiver 222, the example database 224, the example calculator 226, the example comparer 228, the example timer 230, the example damping force manager 232, the example communicator 238 is/are hereby expressly defined to include a non-transitory computer readable storage device or storage disk such as a memory, a digital versatile disk (DVD), a compact disk (CD), a Blu-ray disk, etc. including the software and/or firmware. Further still, the example bump evaluator 128 of FIGS. 1 and/or 2 may include one or more elements, processes and/or devices in addition to, or instead of, those illustrated in FIG. 2, and/or may include more than one of any or all of the illustrated elements, processes and devices.

Figure 4A:
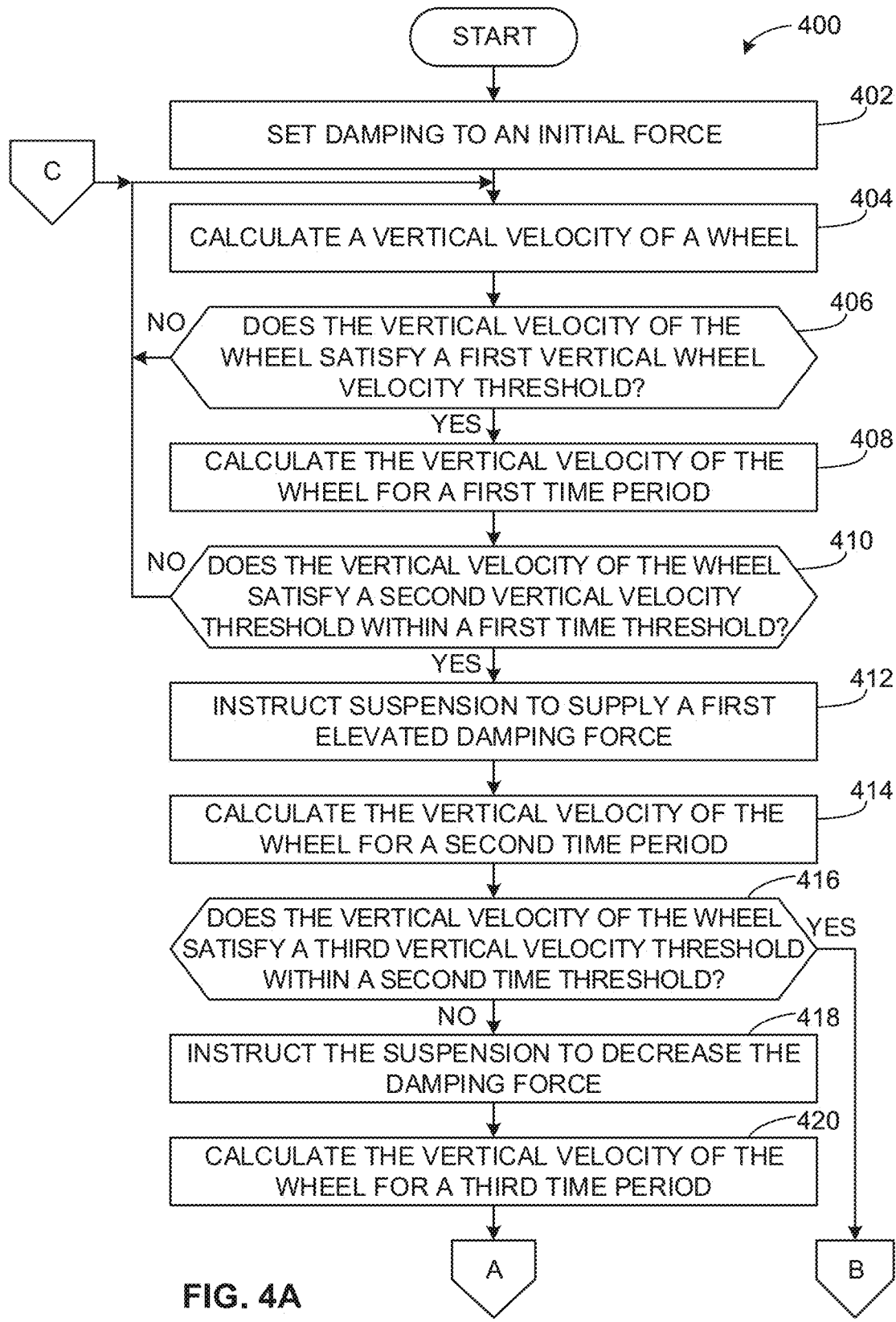
FIGS. 4A and 4B are flowcharts representative of machine readable instructions that may be executed to implement the example system of FIGS. 1 and/or 2.
Figure 4B:
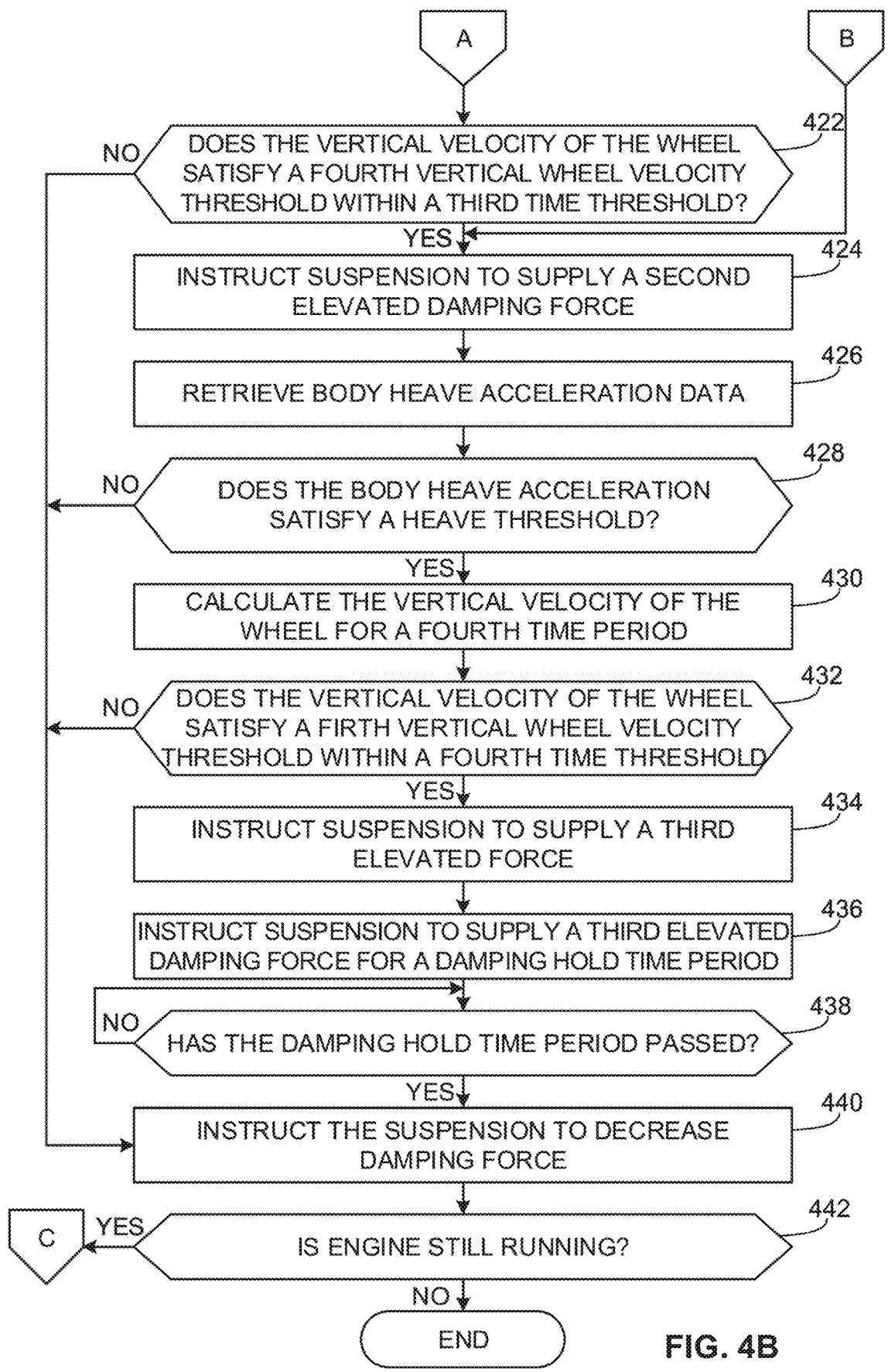
Figure 5:
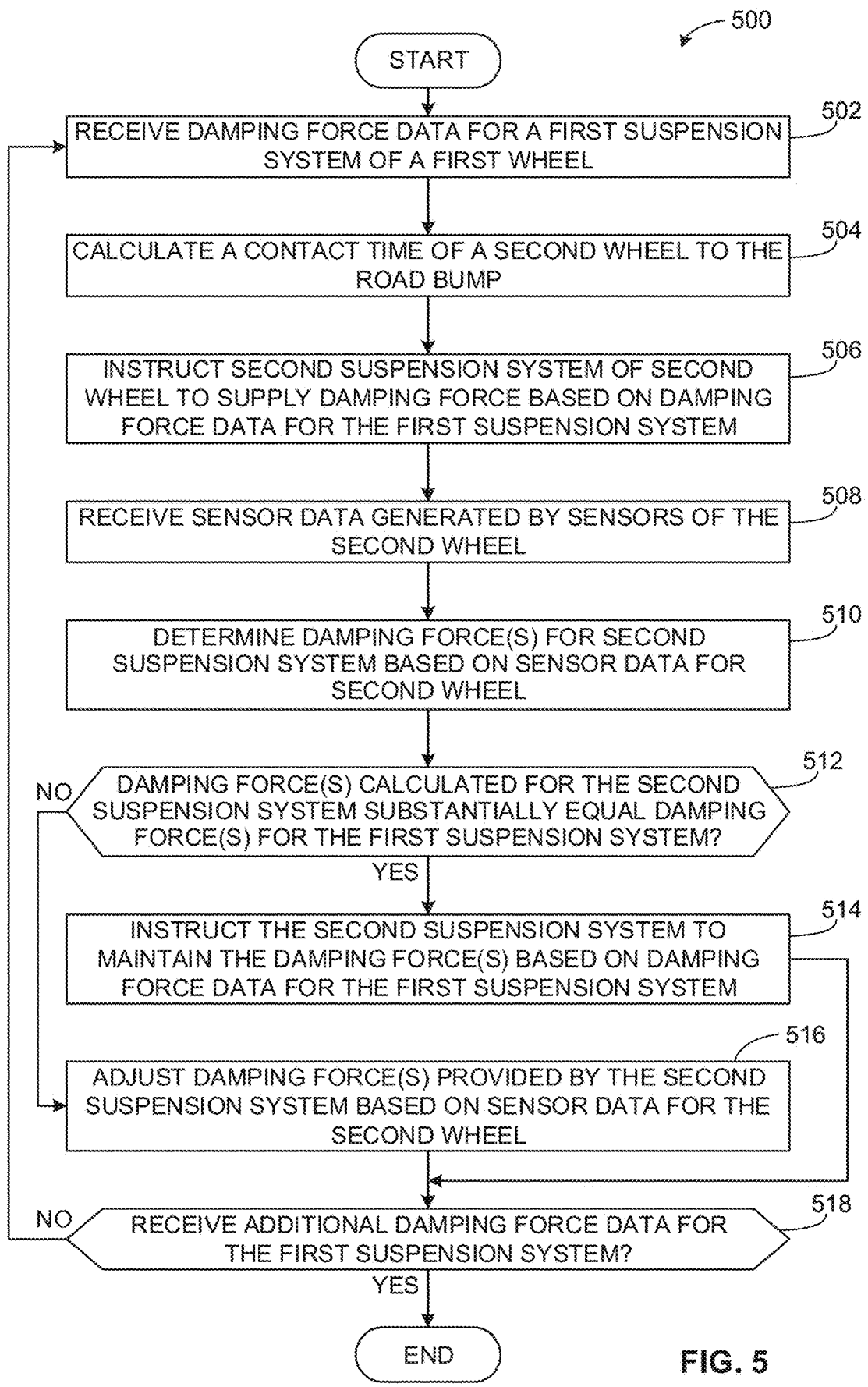
FIG. 5 is a flowchart representative of machine readable instructions that may be executed to implement the example system of FIGS. 1 and/or 2.

Flowcharts representative of example machine readable instructions for implementing the bump evaluator 128 of FIGS. 1 and/or 2 are shown in FIGS. 4A, 4B, and 5. In these examples, the machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4A, 4B, and 5, many other methods of implementing the example bump evaluator 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4A, 4B, and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIGS. 4A and 4B are flowcharts representative of example machine readable instructions 400 that, when executed, cause the example bump evaluator 128 of FIGS. 1 and/or 2 to detect that a vehicle (e.g., the vehicle 104 of FIG. 1) is travelling over a road bump (e.g., the road bump 108 of FIG. 1) based on sensor data generated during travel of the vehicle along a road. The example instructions 400 of FIG. 4 can be executed by the example bump evaluator 128 of FIGS. 1 and/or 2. The bump evaluator of FIGS. 1 and/or 2 can be implemented by one or more processors of the vehicle 104, such as the first suspension controller 120 and/or the second suspension controller 122. The instructions of FIGS. 4A and 4B can be executed in substantially real-time as the sensor data is generated.

The example instructions begin at block 402 of FIG. 4A. The example damping force manager 232 of the bump evaluator 128 sets damping forces to be provided by a vehicle suspension system (e.g., the first suspension system 110, the second suspension system 118 of FIG. 1) to an initial force (block 402). For example, the initial force could be a predefined damping force for vehicle operation on a substantially level road. In other examples, the initial force could be set based on a vehicle setting, such as a driving mode selected by the user (e.g., a driver).

The example calculator 226 of the bump evaluator 128 calculates a vertical velocity of a wheel of the vehicle (e.g., the wheel 105, 107) (block 404). For example, the calculator 226 calculates vertical wheel velocity data 225 based on data received from one or more sensors of the vehicle (e.g., via the sensor data receiver 222 of FIG. 2). In some examples, the calculator 226 calculates the vertical wheel velocity based on the position data 217 collected by the position sensor(s) 217. In some examples, the calculator 226 calculates the vertical wheel velocity data 225 in substantially real time as, for instance, the position data 217 is generated by the position sensor(s) 217.

The comparer 228 compares the example vertical wheel velocity data 225 to a first vertical wheel velocity threshold (block 406). In some examples, the first vertical wheel velocity threshold (e.g., the vertical wheel velocity threshold 229 of FIG. 2) is indicative of wheel jounce, or upward movement of the wheel relative to the body 109 of the vehicle as the wheel contacts a road bump (e.g., corresponding to the first bump stage 312 of FIG. 3). In some examples, the vertical wheel velocity does not indicate any wheel jounce. In such examples, the comparer 228 determines that the damping force does not need to be adjusted and control returns to block 404.

In the example of FIG. 4, if the vertical wheel velocity satisfies the first vertical wheel velocity threshold, the comparer 228 instructs the timer 230 to activate a counter for a first time period. The calculator 226 calculates the vertical velocity of the wheel based on sensor data received during the first time period (block 408). For example, the calculator 226 calculates the vertical wheel velocity data 225 is calculated based on the position data 217 collected by the position sensor 216 during the first time period.

The comparer 228 of FIG. 2 compares the vertical wheel velocity data 225 calculated for the first time period to a second vertical wheel velocity threshold (block 410). The comparer 228 determines if the vertical wheel velocity meets the second vertical wheel velocity threshold within a first time threshold (e.g., the time threshold 231 of FIG. 2). In some examples, if the vertical wheel velocity data does not satisfy the second velocity threshold within the first time threshold, the comparer 228 determines that the wheel is not traveling over a road bump or is traveling over a bump that is not substantially affecting, for instance, the position of the wheel. In such examples, the comparer 228 determines that the damping force does not need to be adjusted and control returns to block 404 as the comparer 228 continues to monitor the vertical wheel velocity.

If the vertical wheel velocity data satisfies the second vertical wheel velocity threshold within the particular time threshold, the comparer 228 determines that the wheel is traveling over a road bump (e.g., corresponding to the second bump stage 314 of FIG. 3). The damping force manager 232 instructs the suspension system (e.g., the first suspension system 110, the second suspension system 118) to supply a first elevated damping force (block 412). For example, the damping force manager 232 requests an increased damping force based on the damping force rule(s) 234 stored in the database 224 of FIG. 2. The requested increased damping force can represent a gradual increase or a step change increase in damping force. The communicator 238 of FIG. 2 can transmit the requested damping force to the suspension system.

In the example of FIG. 4, the calculator 226 calculates the vertical velocity of the wheel for a second time period, or a time period occurring after the damping force has been adjusted at block 412 (block 414). The second period of time can be defined by the timer 230. For example, the calculator 226 calculates the vertical wheel velocity data 225 is calculated based on the position data 217 received from the position sensor 216 after the damping force has been adjusted.

The comparer 228 compares the vertical wheel velocity calculated during the second time period to a third vertical wheel velocity threshold (block 416). In some examples, the third vertical wheel velocity threshold is indicative of wheel jounce as the wheel approaches a crest of the road bump.

If the vertical wheel velocity does not satisfy the third vertical wheel velocity threshold, the example damping force manager 232 instructs the suspension system 110, 118 to decrease the damping force (block 418). In some examples, the damping force manager 232 instructs the suspension system to gradually decrease the damping force; in other examples the decrease corresponds to a step change.

In examples in which the vertical wheel velocity does not meet the third vertical wheel velocity threshold (e.g., the third bump stage 316 of FIG. 3), the bump evaluator 128 continues to monitor the vertical wheel velocity for a period of time to confirm whether or not the wheel is traveling over a road bump that may require further adjustments to the damping force(s). After the damping force manager 232 instructs the suspension system 110, 118 to reduce the damping force, the timer 230 activates a counter for a third time period. The calculator 226 calculates the vertical velocity of the wheel during the third time period (block 420). In some examples, the calculator 226 calculates the vertical velocity of the wheel substantially immediately after the damping force manager 232 instructs suspension system 110, 118 to decrease the damping force. In other examples, the calculator 226 calculates the vertical wheel velocity after some period of time.

The comparer 228 compares the vertical velocity of the wheel calculated after the decrease in damping force to a fourth vertical wheel velocity threshold (block 422). If the vertical wheel velocity does not satisfy the fourth vertical wheel velocity threshold within a predefined time threshold, the comparer 228 determines that the wheel is not traveling over a road bump or is traveling over a small road bump that does not substantially impact wheel position and/or vertical wheel velocity and, thus, is not likely to affect or substantially affect vehicle body motion such that further adjustments to the damping force(s) are necessary. In such examples, the damping force manager 232 instructs the suspension system 110, 118 to reduce the damping force (block 440). In some examples, the damping force manager 232 instructs the suspension system 110, 118 to reduce the damping force until it returns to, for example, the initial damping force (e.g., as determined at block 402). The reduction in the damping force can be implemented gradually or as a step change.

If the comparer 228 determines that the vertical wheel velocity satisfies the fourth vertical wheel velocity threshold (block 424) or if comparer determines that the vertical wheel velocity satisfies the third vertical wheel velocity threshold (block 416), the comparer 228 determines that the wheel is traveling over a road bump (e.g., the fourth bump stage 318 of FIG. 3). In the example of FIG. 4, the damping force manager 232 instructs the suspension system 110, 118 to supply a second elevated damping force (block 424). For example, the damping force manager 232 requests a second increased damping force based on the damping force rule(s) 234 stored in the database 224. The second elevated damping force may be an intermediate or gradual increase in damping force to reduce movement of the vehicle body but not to cause the suspension system 110, 118 to hold the vehicle body overly rigidly or tightly in anticipating of rebound of the wheel as the road bump begins to end.

In the example of FIG. 4, as the wheel continues to travel over the road bump, the comparer 228 retrieves body heave acceleration data 215 (block 426) and compares the body heave acceleration data 215 to a body heave acceleration threshold (block 428). The body heave acceleration threshold (e.g., the body heave acceleration threshold 237 of FIG. 2) can represent, for example, a permitted amount of vehicle body motion for a particular vehicle type, mass, particular standards for ride quality, etc. If the body heave acceleration data 215 is greater than the body heave acceleration threshold, the comparer 228 determines that the body 109 of the vehicle 104 will or is likely to rebound and oscillate when road bump ends and the road substantially levels. In the example of FIG. 4, if the body heave acceleration data 215 does not exceed the body heave acceleration threshold, the damping force manager 232 determines that the damping force(s) do not need to be further increased. In some such examples, the damping force manager 232 instructs the suspension system 110, 118 to (e.g., gradually) decrease the damping force(s) (block 440). Thus, in the example of FIG. 4, if the vehicle body heave acceleration does not exceed the threshold, the damping force manager 232 refrains from further increasing the damping force(s) to prevent unnecessary changes to the vehicle ride by causing the suspension system 110, 118 to hold the vehicle body overly rigidly or tightly.

In the example of FIG. 4, if the body heave acceleration data 215 satisfies the body heave acceleration threshold (block 428), the calculator 226 calculates the vertical velocity of the wheel (block 430). For example, the vertical wheel velocity data 225 is calculated based on the position data 217 received from the position sensor 216 as the wheel continues to travel over the road bump. The comparer 228 compares the calculated vertical velocity data of the wheel to a fifth vertical wheel velocity threshold (block 432). In some examples, the fifth vertical wheel velocity threshold represents rebound or falling of the wheel, or movement of the wheel away from the vehicle body as the road bump ends (corresponding to the fifth bump stage 320 of FIG. 3). In the example of FIG. 3, if the comparer 228 determines the vertical velocity data of the wheel does not satisfy the fifth vertical wheel threshold (e.g., within a particular time threshold), damping force manager 232 determines that further increases to the damping force(s) are not required. In some such examples, the damping force manager 232 instructs the suspension system 110, 118 to reduce the damping force(s) as the vehicle returns to substantially level road (block 440).

If the comparer 228 determines that the vertical wheel velocity satisfies the fifth vertical wheel velocity threshold, the damping force manager 232 instructs the suspension system 110, 118 to supply a third elevated damping force (block 434). In such examples, the damping force manager 232 requests the third elevated damping force to prepare the suspension system 110, 118 to contact the substantially level ground after the road bump ends and to substantially reduce oscillations of the vehicle body (e.g., the fifth bump stage 320 of FIG. 3). In some examples, the third elevated damping force is greater than, for example, the first or second evaluated damping forces (e.g., at blocks 412, 418). The damping force manager 232 can request the third elevated damping force based on the damping force rule(s) 234 indicating that a greater amount of damping force should be requested when the wheel is rebounding to prepare for impact of the wheel with the substantially level road.

The example damping force manager 232 instructs the suspension system 110, 118 of FIG. 2 to supply the third elevated damping force for a predefined damping hold time period (block 436). The damping force manager 232 instructs the suspension system 110, 118 to supply the third elevated damping for the damping hold time period to reduce an amount of time for oscillations of the vehicle body to decay. The damping force rule(s) 234 can define the damping hold time period for the third elevated damping force to be maintained based on, for example, vehicle type, vehicle mass, an estimated or average time for oscillations to decay (e.g., 200-1000 milliseconds).

In the example of FIG. 4, the timer 230 determines when the damping hold time period ends (block 438). The damping force manager 232 instructs the suspension system 110, 118 to maintain the third elevated damping force until the timer 230 determines that the damping hold time period has ended. After the damping hold time period has ended, the example damping force manager 232 instructs the suspension system 110, 118 to reduce the damping force (block 440). In some examples, the damping force manager 232 decreases the damping force to the initial damping force (e.g., as determined at block 402). The instructions 400 cause the bump evaluator 128 to continue to monitor for changes in vertical wheel velocity and to detect if the vehicle is traveling over road bump(s) until the bump evaluator 128 determines that the vehicle engine is no longer running (block 442), at which time the instructions 400 end.

FIG. 5 is a flowchart representative of example machine readable instructions 500 that, cause a bump evaluator of a first suspension system controller of a vehicle (e.g., one of the first suspension controller 120 or the second suspension controller 122) to determine damping force adjustments to a vehicle suspension system (e.g., the vehicle suspension system 110, 118) based on data received from a bump evaluator of a second suspension controller of the vehicle (e.g., the other of the first suspension controller 120 or the second suspension controller 122). The example instructions 500 of FIG. 5 can be executed by the example bump evaluator 128 of FIGS. 1 and/or 2. The bump evaluator 128 of FIGS. 1 and/or 2 can be implemented by one or more processors of the vehicle 104, such as the first suspension controller 120 and/or the second suspension controller 122. The instructions of FIG. 5 can be executed in substantially real-time as the sensor data is generated and as road bump(s) are detected at one or more of the suspension system controllers 120, 122.

In the example of FIG. 5, the communicator 238 of, for example, the bump evaluator 128 of the second or rear suspension controller 122 receives damping force data from the bump evaluator 128 of the first or front suspension controller 120 (block 502). The damping force data can include damping force(s) to be provided by the first or front suspension system 110. The damping force(s) to be provided by the front suspension system 110 can be determined by the bump evaluator 128 of the front suspension controller 120 based on sensor data for a first or front wheel (e.g., the first wheel 105) as substantially disclosed above in connection with the instructions 400 of FIGS. 4A and 4B. In some examples, the communicator 238 of the bump evaluator 128 of the rear suspension controller 120 receives the damping force data from the bump evaluator 128 of the front suspension controller 120 when the bump evaluator 128 of the front suspension controller 120 determines that the front wheel 105 is traveling over a road bump. In other examples, the communicator 238 receives the damping force data periodically, each time a damping force request is generated by the bump evaluator 128 of the first suspension controller 120, and/or at other predefined time periods, etc.

The calculator 226 of the bump evaluator 128 of the rear suspension controller 122 calculates a time at which a second or rear wheel (e.g., the second wheel 107) is expected to contact the road bump (block 504). For example, the calculator 226 calculates a contact time based on vehicle velocity data 219 generated by the vehicle velocity sensor 218 to determine a time the vehicle traverses the distance between the first wheel and the second wheel. In some examples, the calculator 226 adjusts for variable speeds of the vehicle 104 (e.g., based on acceleration data obtained from vehicle accelerometer(s)).

In the example of FIG. 5, the damping force manager 232 of the bump evaluator 128 of the rear suspension controller 122 instructs the rear suspension system 118 of the rear wheel 107 to supply damping force(s) based on the damping force data received from the front suspension controller 120 (block 506). In some examples, the damping force manager 232 of the rear suspension controller 122 determines a time at which the damping force(s) should be supplied by the rear suspension system 118 based on the expected contact time of the rear wheel 107 at the road bump.

As the vehicle travels, the sensor data receiver 222 of the bump evaluator 128 of the rear suspension controller 122 receives sensor data for the rear wheel 107 and/or a rear portion of the vehicle body 109 (block 508). For example, when the rear wheel 107 contacts the road bump, sensor(s) 126, 200, 214, 216, 218 generate data about the behavior of the rear wheel 107 and/or the vehicle body 109 that is transmitted to the sensor data receiver 222.

In the example of FIG. 5, the bump evaluator 128 of the rear suspension controller 122 determines the damping force(s) to be provided by the rear suspension system 118 based on the sensor data for the second wheel 107 (block 510). The damping force manager 232 of the bump evaluator 128 can determine the damping force(s) to be provided by the rear suspension system 118 as substantially disclosed above in connection with the example instructions 400 of FIGS. 4A and 4B. For example, the damping force manager 232 can determine the damping force(s) to be provided by the rear suspension system 118 based on an analysis by the comparer 228 of vertical wheel velocity data for the rear wheel 107 relative to corresponding thresholds.

In the example of FIG. 5, the comparer 228 of the bump evaluator 128 of the rear suspension controller 122 compares the damping force(s) determined based on the sensor data for the rear wheel 107 to the damping force(s) received from the bump evaluator 128 of the front suspension controller 120 for the front wheel 105. The comparer 228 determines if the respective damping force(s) to be provided by the second suspension system 118 are substantially equal to the damping force(s) to be provided by the front suspension system 110 (block 512). In some instances, the respective bump evaluators 128 of the first and second suspension controllers 120, 122 may calculate different damping force(s) due to differences in behavior of the front wheel 105 and the rear wheel 107 as each wheel travels over the road bump (e.g., as captured by the corresponding sensor data). In some examples, only a portion of the rear wheel 107 may travel over the road bump as compared to the first wheel 105. In some other examples, the rear wheel 107 does not travel over the road bump if, for example, the travel path of the vehicle changed (e.g., the vehicle turned a corner). Thus, in some examples, experiences of the respective wheels 105, 107 relative to the road bump may differ.

In the example of FIG. 5, if the damping force(s) to be supplied by the front and rear suspension systems 110, 118 are substantially equal (e.g., within a particular, predefined threshold range), the damping force manager 232 of the bump evaluator 128 of the rear suspension controller 122 instructs the rear suspension system 118 to maintain the damping force(s) based on the damping force(s) provided by the first suspension system 110 (block 514). Thus, in some examples, the response of the front wheel, 105, the rear wheel 107, and/or the vehicle body 109 are substantially similar as the front wheel 105 and the rear wheel 107 travel over the road bump.

In the example of FIG. 5, if the damping force(s) to be supplied by the front and rear suspension systems 110, 118 are not substantially equal, the damping force manager 232 of the bump evaluator 128 of the rear suspension controller 122 instructs the rear suspension system 118 to adjust the damping force(s) to be provided by the rear suspension system 118 based on the sensor data for the rear wheel 107 (block 516). For example, the damping force manager 232 may determine that less damping is required at the rear wheel 107 than the front wheel 105 based on the sensor data generated as the rear wheel travels over the road bump. Thus, the example instructions of FIG. 5 account for differences in vehicle behavior as different portions of the vehicle (e.g., the front wheel 105, the rear wheel 107, a front portion of the vehicle body, a rear portion of the vehicle body, etc.) travel over the road bump. The example instructions 500 of FIG. 5 end when there is no further data exchanged between the bump evaluators of the respective suspension controller 120, 122 (block 518).

Figure 6:
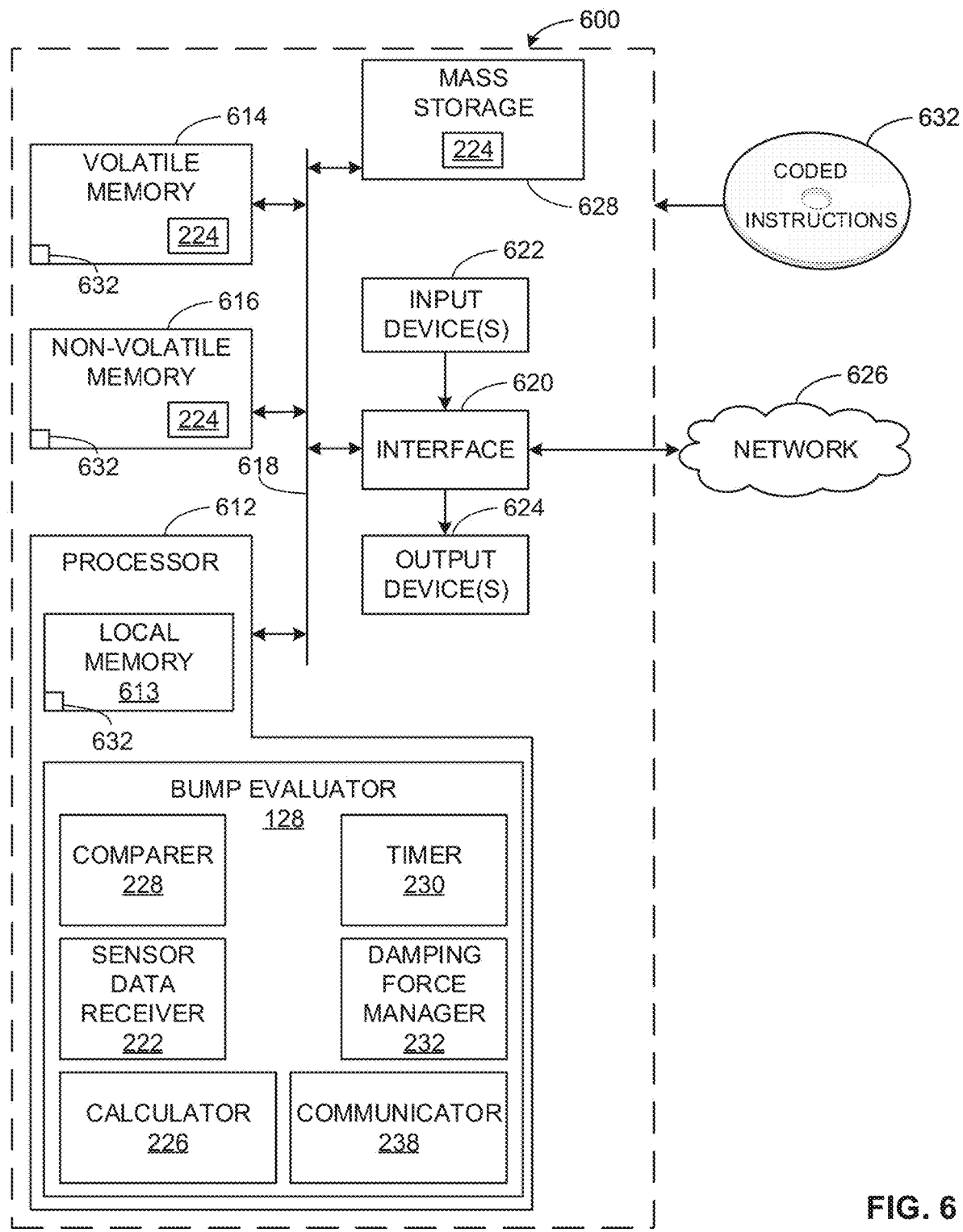
FIG. 6 is a block diagram of an example processing platform structured to execute the example instructions of FIGS. 4A and 4B and/or FIG. 5 to implement the example system of FIGS. 1-2.

FIG. 6 is a block diagram of an example processor platform 600 capable of executing the instructions of FIGS. 4A, 4B, and/or 5 to implement the bump evaluator 128 of FIGS. 1 and 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor 612 implements the example sensor data receiver 222, the example calculator 226, the example comparer 228, the example timer 230, the example damping force manager 232, and the example communicator 238.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller. The database 224 of the processor 612 may be implemented by the main memory 614, 616 and/or the local memory 613.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.). In some examples, the interface circuit 620 implements the example sensor data receiver 222 and the example communicator 238.

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. Some or all of the database 224 may be stored in the mass storage 628.

The coded instructions 632 of FIGS. 4A, 4B, and/or FIG. 5 may be stored in the mass storage device 628, in the volatile memory 614, in the non-volatile memory 616, and/or on a removable tangible computer readable storage medium such as a CD or DVD.

From the foregoing, it will be appreciated that example methods, systems, and apparatus have been disclosed to detect when a vehicle is traveling over road bump(s) and to optimize vehicle ride performance by adjusting vehicle suspension system(s) in response to the detection. Some disclosed examples determine that the vehicle is traveling over a road bump by identifying changes in vertical wheel velocity as the vehicle travels over the road bump. Based on the determination that the vehicle is traveling over the road bump, some disclosed examples automatically instruct the suspension system(s) to generate damping forces and/or adjust damping forces to reduce oscillations of the vehicle body. Some disclosed examples determine that the vehicle is traveling over a road bump by monitoring the vertical wheel velocity over time and/or relative to predefined thresholds to reduce instances of false positives when detecting road bumps. Disclosed examples provide for selective adjustment of damping forces to improve vehicle ride performance and reduce wear and tear on suspension components of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
non-transitory memory; and
a processor to implement:
    a calculator to:
        calculate a first vertical velocity of a wheel of a vehicle at a first time; and
        calculate a second vertical velocity of the wheel at a second time, the second time occurring after the first time;
    a comparer to:
        perform a comparison of the first vertical velocity to a first threshold, the first threshold associated with movement of the wheel upward relative to a frame of the vehicle;
        detect a change between the first vertical velocity and the second vertical velocity; and
        in response to the detection of the change, perform a comparison of the second vertical velocity to a second threshold, the second threshold associated with movement the wheel downward relative to the frame;
    a damping force manager to:
        determine a first damping force to be generated by a suspension system of the vehicle when the first vertical velocity satisfies the first threshold; and
        determine a second damping force to be generated by the suspension system when the second vertical velocity satisfies the second threshold; and
    a communicator to transmit a first request including the first damping force to be generated and a second request including the second damping force to be generated to the suspension system.

2. The apparatus of claim 1, wherein the comparer is to determine if the first vertical velocity satisfies the first threshold within a first time period.

3. The apparatus of claim 1, wherein the damping force manager is to further determine the first damping force to be generated by the suspension system based on body heave acceleration data for the vehicle.

4. The apparatus of claim 1, wherein the damping force manager is to generate a third request instructing the suspension system to maintain the first damping force for a predefined period of time.

5. The apparatus of claim 1, wherein the second damping force is greater than the first damping force.

6. The apparatus of claim 1, wherein the wheel is a first wheel of the vehicle, the suspension system is a first suspension system, and wherein
    the damping force manager is to predict a third damping force to be generated by a second suspension system of the vehicle, the second suspension system associated with a second wheel of the vehicle,
    the calculator is to calculate a third vertical velocity of the second wheel in response to the generation of the third damping force by the second suspension system, and the damping force manager is to determine a fourth damping force to be generated by the second suspension system based on the third vertical velocity.

7. The apparatus of claim 1, wherein the calculator is to calculate a third vertical velocity of the wheel at a third time, the third time occurring between the first time and the second time, and the damping force manager is to determine a third damping force to be generated by the suspension system based on the third vertical velocity, the third damping force less than the first damping force and the second damping force.

8. The apparatus of claim 1, wherein the second request includes an instruction for the suspension system to maintain the second damping force for a predefined period of time.

9. The apparatus of claim 8, wherein the predefined period of time is defined based on one or more of a mass of the vehicle or a vehicle type.

10. The apparatus of claim 1, wherein the first threshold is based on height data for one or more road surface elevations.

11. A method comprising:

calculating, by executing an instruction with a processor, a first vertical velocity of a wheel of a vehicle at a first time;

calculating, by executing an instruction with the processor, a second vertical velocity of the wheel at a second time, the second time occurring after the first time;

performing, by executing an instruction with the processor, a comparison of the first vertical velocity to a first threshold, the first threshold associated with movement of the wheel upward relative to a frame of the vehicle;

detecting a change between the first vertical velocity and the second vertical velocity;

in response to the detection of the change, performing, by executing an instruction with the processor, a comparison of the second vertical velocity to a second threshold, the second threshold associated with movement the wheel downward relative to the frame;

determining, by executing an instruction with the processor, a first damping force to be generated by a suspension system of the vehicle when the first vertical velocity satisfies the first threshold;

determining, by executing an instruction with the processor, a second damping force to be generated by the suspension system when the second vertical velocity satisfies the second threshold; and transmitting a first request including the first damping force to be generated and a second request including the second damping force to be generated to the suspension system.

12. The method of claim 11, wherein further including determining if the first vertical velocity satisfies the first threshold within a first time period.

13. The method of claim 11, further including determining the first damping force to be generated by the suspension system based on body heave acceleration data for the vehicle.

14. The method of claim 11, further including generating a third request instructing the suspension system to maintain the first damping force for a predefined period of time.

15. The method of claim 11, wherein the second damping force is greater than the first damping force.

16. A non-transitory computer readable storage medium comprising computer readable instructions which, when executed by a processor, cause the processor to at least:

calculate a first vertical velocity of a wheel of a vehicle at a first time; and calculate a second vertical velocity of the wheel at a second time, the second time occurring after the first time;

perform a comparison of the first vertical velocity to a first threshold, the first threshold associated with movement of the wheel upward relative to a frame of the vehicle;

detect a change between the first vertical velocity and the second vertical velocity; and in response to the detection of the change, perform a comparison of the second vertical velocity to a second threshold, the second threshold associated with movement the wheel downward relative to the frame;

determine a first damping force to be generated by a suspension system of the vehicle when the first vertical velocity satisfies the first threshold;

determine a second damping force to be generated by the suspension system when the second vertical velocity satisfies the second threshold; and transmit a first request including the first damping force to be generated and a second request including the second damping force to be generated to the suspension system.

17. The non-transitory computer readable storage medium of claim 16, wherein the instructions, when executed by the processor, cause the processor to determine if the first vertical velocity satisfies the first threshold within a first time period.

18. The non-transitory computer readable storage medium of claim 16, wherein the instructions, when executed by the processor, further cause the processor to determine the first damping force to be generated by the suspension system based on body heave acceleration data.

19. The non-transitory computer readable storage medium of claim 16, wherein the second damping force is greater than the first damping force.

20. The non-transitory computer readable storage medium of claim 16, wherein the second request includes an instruction for the suspension system to maintain the second damping force for a predefined period of time.

* * * * *